United States Patent
Hasegawa

(10) Patent No.: US 8,725,969 B2
(45) Date of Patent: May 13, 2014

(54) DISTRIBUTED CONTENT STORAGE SYSTEM SUPPORTING DIFFERENT REDUNDANCY DEGREES

(75) Inventor: Kenji Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 101 days.

(21) Appl. No.: 13/148,894

(22) PCT Filed: Dec. 17, 2009

(86) PCT No.: PCT/JP2009/006947
§ 371 (c)(1),
(2), (4) Date: Aug. 10, 2011

(87) PCT Pub. No.: WO2010/109568
PCT Pub. Date: Sep. 30, 2010

(65) Prior Publication Data
US 2012/0011318 A1  Jan. 12, 2012

(30) Foreign Application Priority Data
Mar. 24, 2009  (JP) ................................ 2009-071081

(51) Int. Cl.
*G06F 12/08* (2006.01)
(52) U.S. Cl.
USPC .......................................... 711/162; 711/114
(58) Field of Classification Search
None
See application file for complete search history.

(56) References Cited

U.S. PATENT DOCUMENTS

| 5,664,187 A * | 9/1997 | Burkes et al. ................. 714/6.21 |
| 6,049,890 A * | 4/2000 | Kakuta et al. ................. 714/6.21 |
| 8,200,923 B1 * | 6/2012 | Healey et al. .................. 711/162 |
| 2005/0144172 A1 * | 6/2005 | Kilian et al. .................... 707/10 |
| 2006/0136668 A1 * | 6/2006 | Rudelic ........................ 711/118 |

FOREIGN PATENT DOCUMENTS

| JP | 9-311810 A | 12/1997 |
| JP | 2005182532 A | 7/2005 |
| JP | 2005235171 A | 9/2005 |
| JP | 2007200182 A | 8/2007 |

OTHER PUBLICATIONS

International Search Report for PCT/JP2009/006947 mailed Feb. 16, 2010.

* cited by examiner

Primary Examiner — Charles Rones
Assistant Examiner — Tian-Pong Chang
(74) Attorney, Agent, or Firm — Sughrue Mion, PLLC

(57) ABSTRACT

A storage device includes: a data storing control unit configured to store storage target data into a storage device and, in the case of storing other storage target data with the same data content as the storage target data already stored in the storage device into the storage device, control so as to refer to the storage target data already stored in the storage device as the other storage target data; a reference count management unit configured to, for each of the storage target data stored in the storage device, store a reference count that is a number of times that the storage target data is referred to as other storage target data; and a redundancy degree control unit configured to execute redundancy processing corresponding to a redundancy degree proper to the reference count of the storage target data, and store the storage target data into the storage device.

11 Claims, 7 Drawing Sheets

| CONTENT ADDRESS | REFERENCE COUNTER | REDUNDANCY DEGREE | STORING DESTINATION ADDRESS |
|---|---|---|---|
| CA1 | 5 | 3 | DATA FILE 1/Offset1 |
| CA2 | 31 | 6 | DATA FILE 1/Offset2 |
| CA3 | 23 | 6 | DATA FILE 2/Offset3 |
| CA4 | 1 | 3 | DATA FILE 3/Offset4 |
| CA5 | 8 | 3 | DATA FILE 4/Offset5 |
| CA6 | 11 | 3 | DATA FILE 4/Offset5 |
| CA7 | 21 | 6 | DATA FILE 4/Offset5 |

(B)

| REFERENCE COUNT | PROPER REDUNDANCY DEGREE |
|---|---|
| 1~10 | 3 |
| 11~100 | 6 |
| 101~1000 | 9 |

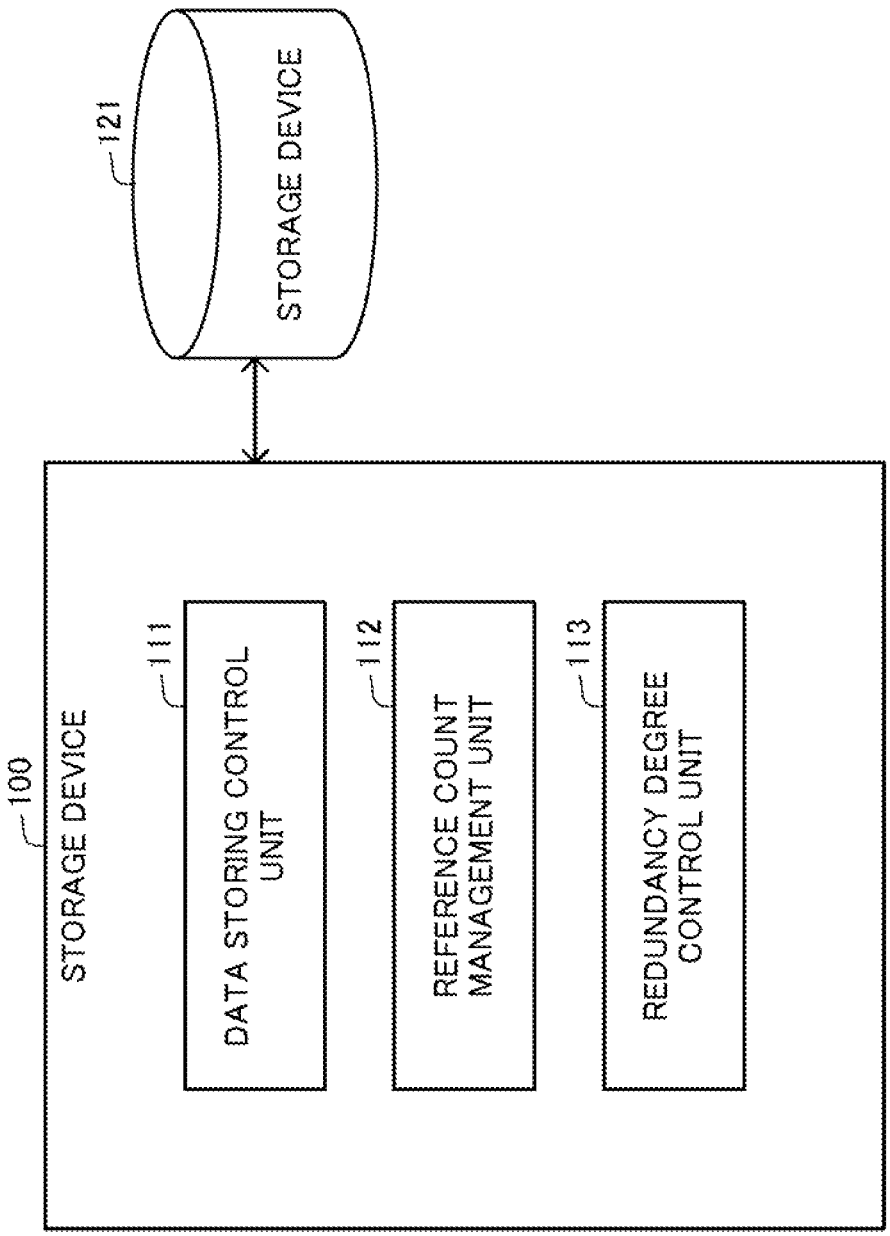

DISTRIBUTED CONTENT STORAGE SYSTEM SUPPORTING DIFFERENT REDUNDANCY DEGREES

TECHNICAL FIELD

The present invention relates to a storage device, and specifically, relates to a content address type of storage device that manages a storing position according to the content of stored data.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost of a storage device. In addition, it is required that data can be retrieved later with ease. As a result, such a storage system is desired that is capable of automatically realizing increase of the storage capacity and the performance, that eliminates duplicated storage to reduce the cost of storage, and that has high redundancy.

Under such circumstances, in recent years, a content address storage system has been developed as shown in Patent Document 1. This content address storage system distributedly stores data into a plurality of storage devices, and specifies a storing position in which the data is stored based on a unique content address specified according to the content of the data. To be specific, the content address storage system divides given data into a plurality of fragments, adds a fragment to become redundant data thereto, and stores these fragments into a plurality of storage devices, respectively.

Later, by designating a content address, it is possible to retrieve data, namely, a fragment stored in a storing position specified by the content address, and restore the given data before being divided from the plurality of fragments.

Further, the content address is generated so as to be unique according to the content of data. Therefore, in the case of duplicated data, it is possible to refer to data in the same storing position to thereby acquire data with the same content. Accordingly, it is not necessary to separately store the duplicated data, and it is possible to eliminate duplicated recording and reduce the amount of data.

[Patent Document 1] Japanese Unexamined Patent Application Publication No. JP-A 2005-235171

However, in the content address storage system that eliminates duplicated recording as described above, in a case that a given data block having been stored is lost, all the other data referring to the data block are affected. For example, assuming a data block with a reference count of 100 exists, this data block is the same data as the other one-hundred data blocks and hence the one-hundred data blocks do not exist and only the one data block is stored. Therefore, in a case that this data block with a reference count of 100 is lost, the other one-hundred pieces of logical data referring to the data block are lost.

Accordingly, in order to increase the fault tolerance of stored data, the content address storage system generally executes a process for maintaining the redundancy degree of each data block high. For example, in order to secure a certain redundancy degree that is previously set, the content address storage system stores data blocks provided with redundant data. However, such a redundancy degree is uniformly given to all of the data blocks. That is to say, for example, the redundancy degree of a data block with a reference count '1' and the redundancy degree of a data block with a reference count '100' are equally handled. In such a case, the data block with the reference count '100' has a larger influence on the stored data, but the same redundancy degree and storing region are also given to the data block with the reference count '1.'

SUMMARY

Accordingly, an object of the present invention is to provide a storage device capable of realizing increase of the reliability and the system performance as the aforementioned task.

In order to achieve the object, a storage device of an embodiment of the present invention includes:

a data storing control unit configured to store storage target data into a storage device and, in a case of storing other storage target data with a same content as the storage target data already stored in the storage device, into the storage device, control so as to refer to the storage target data already stored in the storage device as the other storage target data;

a reference count management unit configured to, for each of the storage target data stored in the storage device, store a reference count that is a number of times that the storage target data is referred to as other storage target data; and a redundancy degree control unit configured to execute redundancy processing corresponding to a redundancy degree proper to the reference count of the storage target data, and store the storage target data into the storage device.

Further, a computer program of another embodiment of the present invention is a computer program including instructions for causing an information processing device to realize:

a data storing control unit configured to store storage target data into a storage device and, in a case of storing other storage target data with a same content as the storage target data already stored in the storage device into the storage device, control so as to refer to the storage target data already stored in the storage device as the other storage target data;

a reference count management unit configured to, for each of the storage target data stored in the storage device, store a reference count that is a number of times that the storage target data is referred to as other storage target data; and a redundancy degree control unit configured to execute redundancy processing corresponding to a redundancy degree proper to the reference count of the storage target data, and store the storage target data into the storage device.

Further, a data storing method of another embodiment of the present invention includes:

executing a data storing process of storing storage target data into a storage device and, in a case of storing other storage target data with a same content as the storage target data already stored in the storage device into the storage device, controlling so as to refer to the storage target data already stored in the storage device as the other storage target data;

for each of the storage target data stored in the storage device, storing a reference count that is a number of times that the storage target data is referred to as other storage target data; and executing redundancy processing corresponding to a redundancy degree proper to the reference count of the storage target data, and storing the storage target data into the storage device.

With the configurations as described above, the present invention can realize increase of the reliability of a storage device and the system performance.

BRIEF DESCRIPTION OF DRAWINGS

FIGS. 2A and 2B are views each showing an example of data stored in the storage device disclosed in FIG. 1;

FIG. 7 is a function block diagram showing a configuration of a storage device in a second exemplary embodiment.

EXEMPLARY EMBODIMENTS

First Exemplary Embodiment

Figure 1:
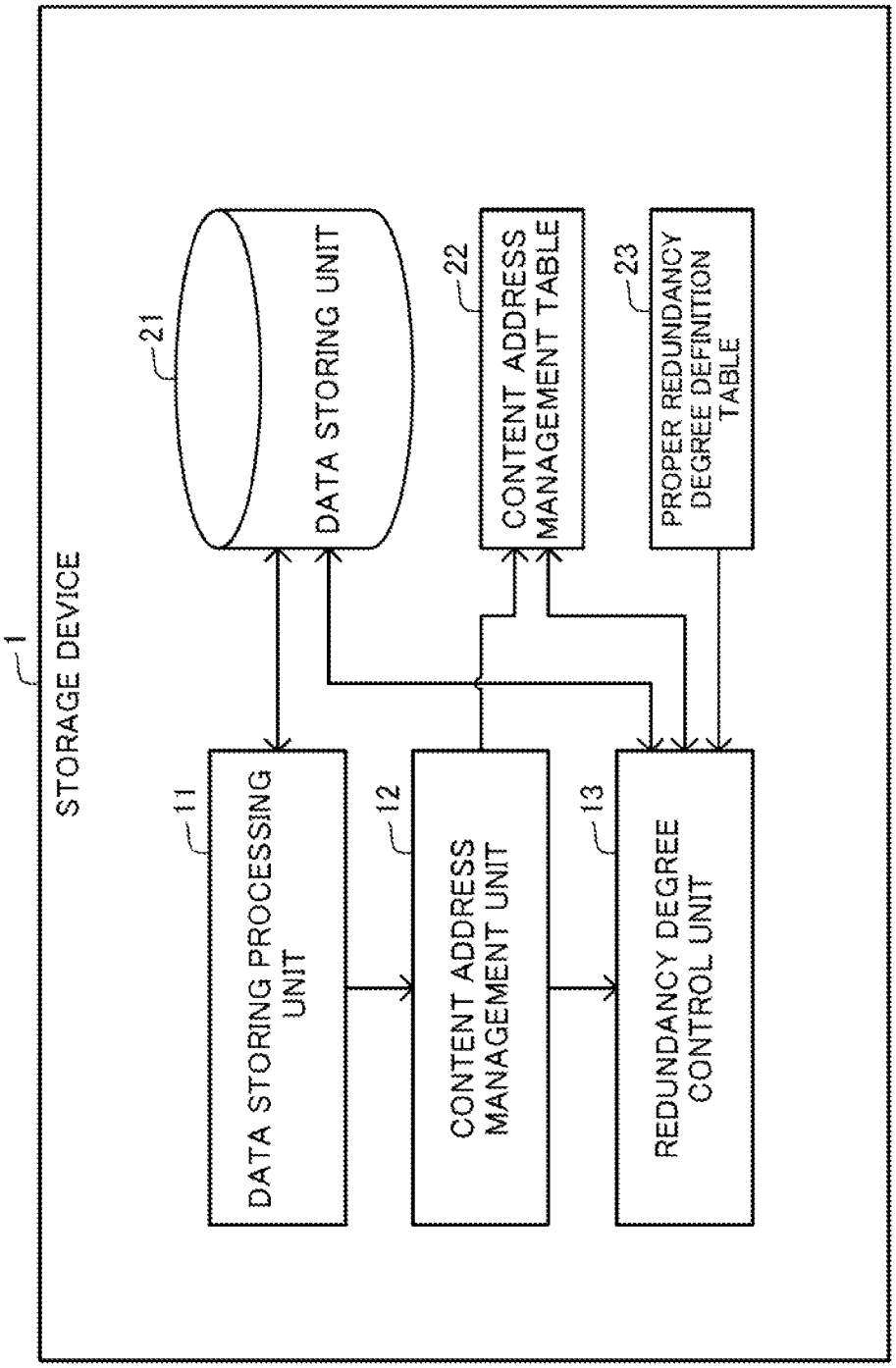
FIG. 1 is a function block diagram showing a configuration of a storage device in a first exemplary embodiment.
Figure 3:
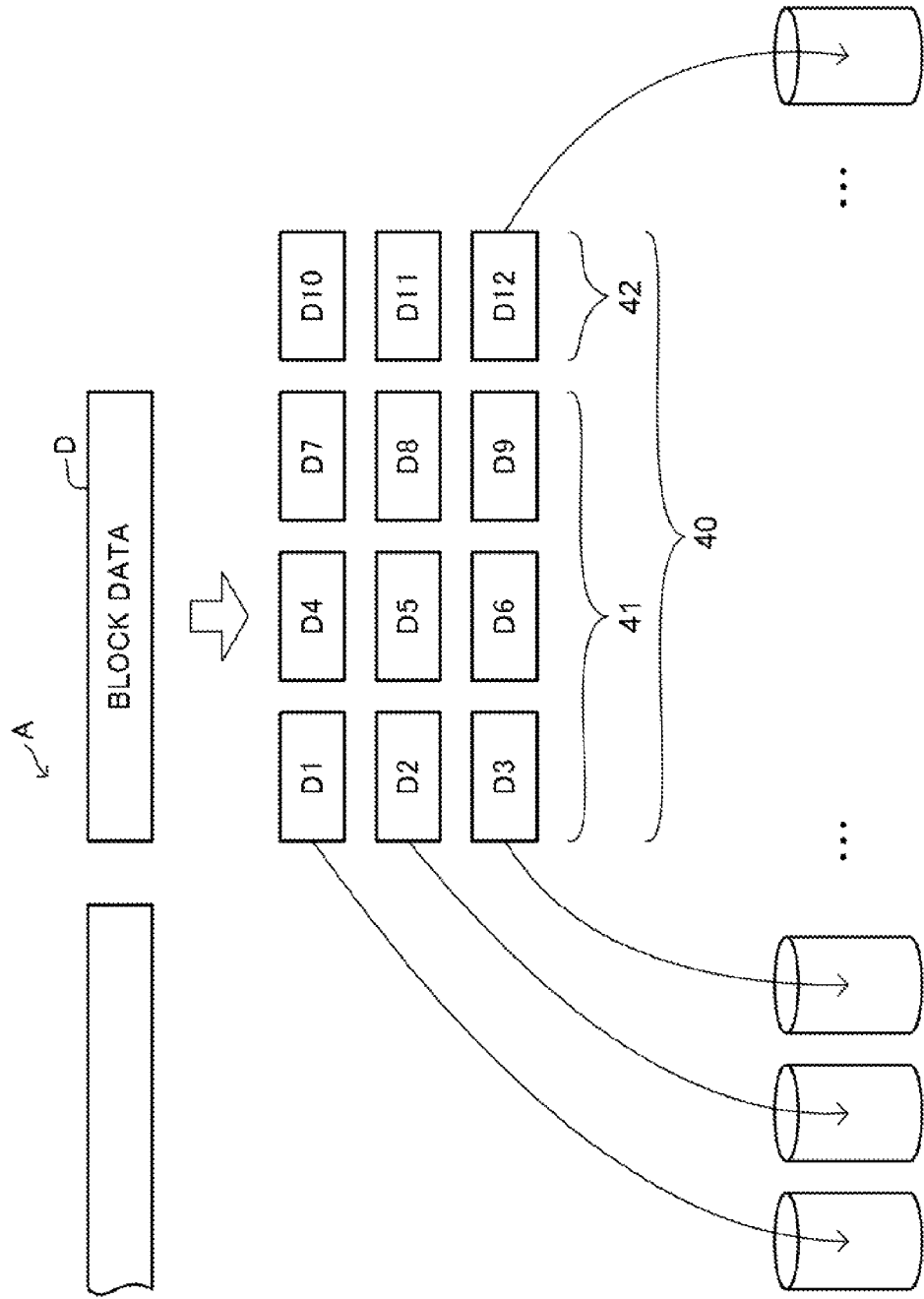
FIG. 3 is a view showing an aspect when data is stored in the storage device disclosed in FIG. 1.
Figure 4:
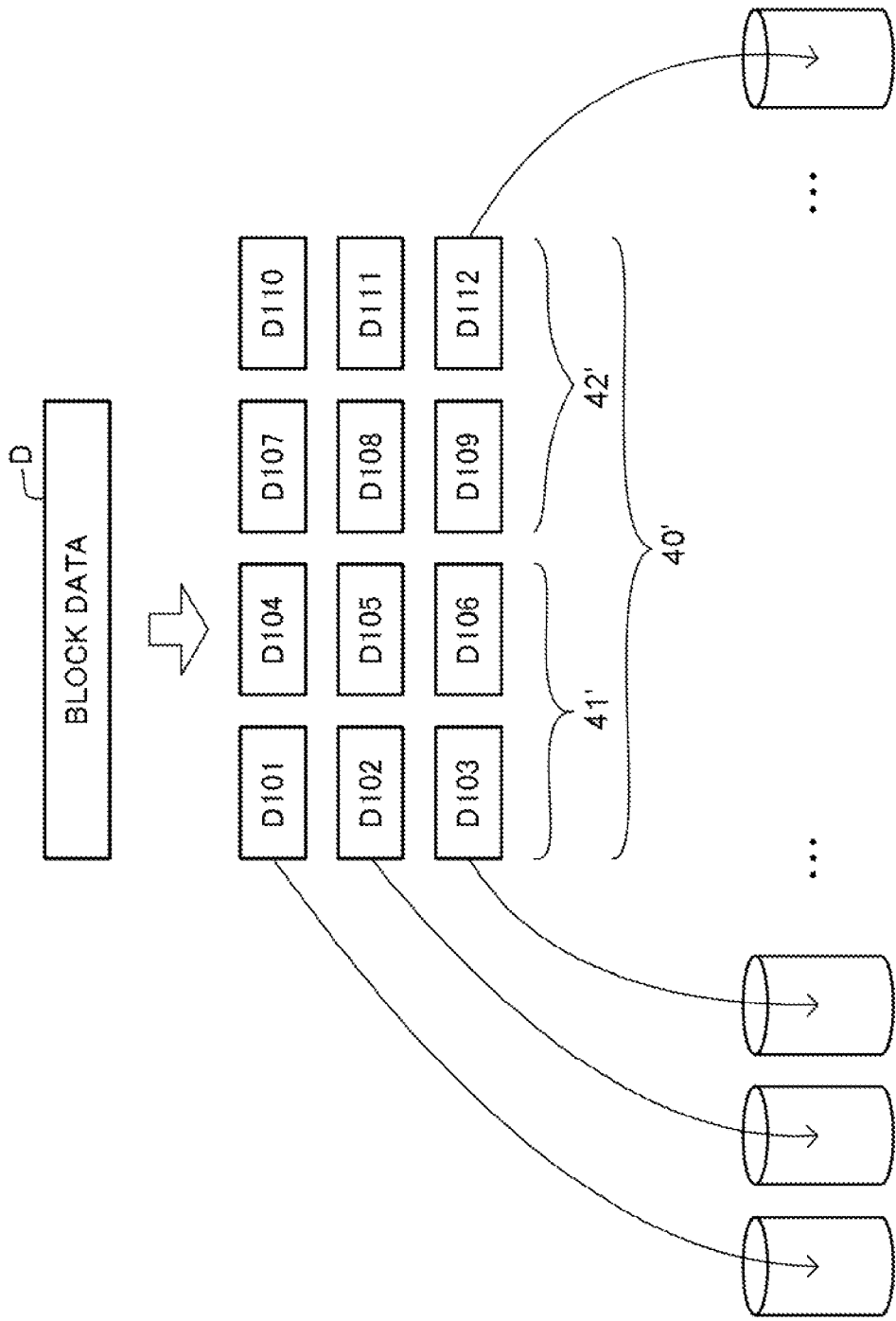
FIG. 4 is a view showing an aspect when data is stored in the storage device disclosed in FIG. 1.
Figure 5:
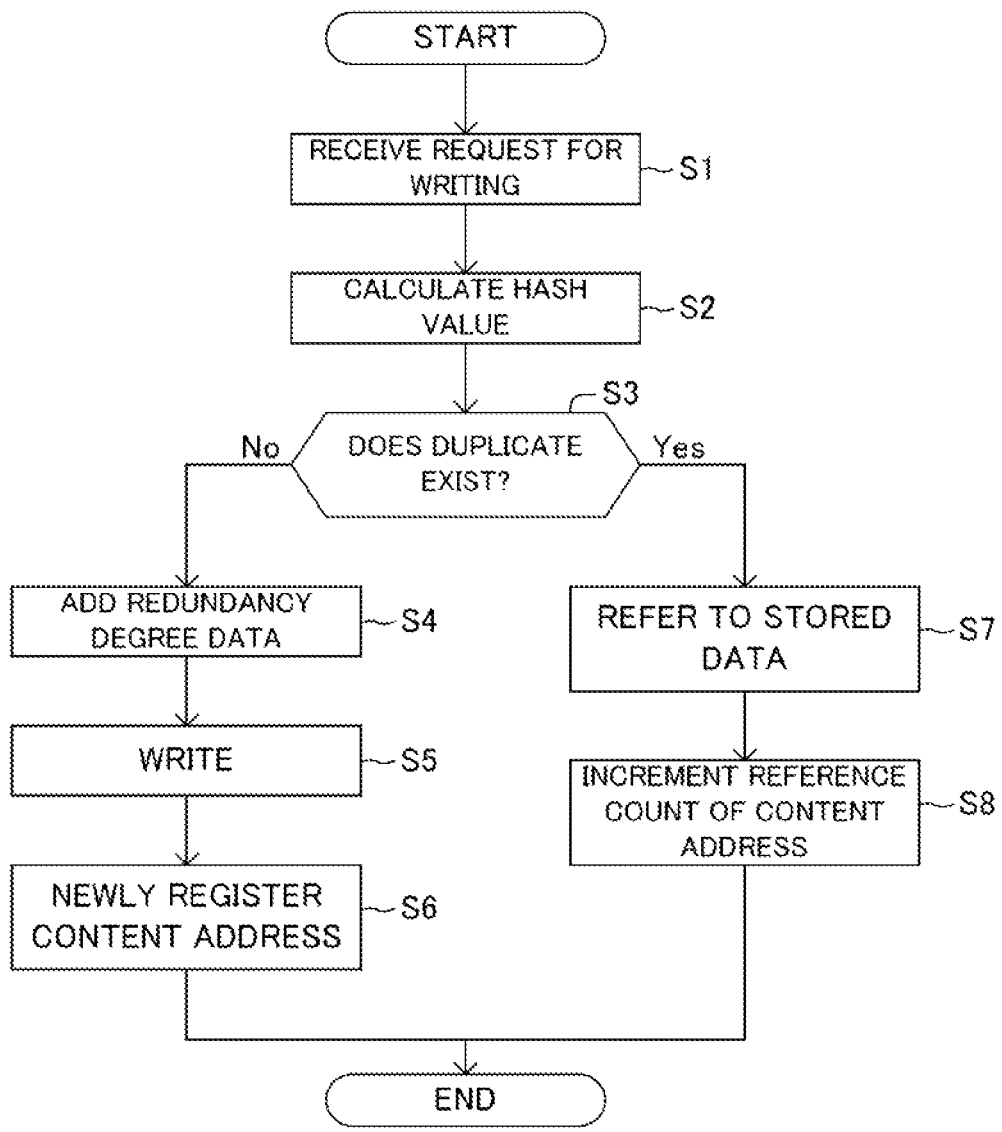
FIG. 5 is a flowchart showing an operation of the storage device disclosed in FIG. 1.
Figure 6:
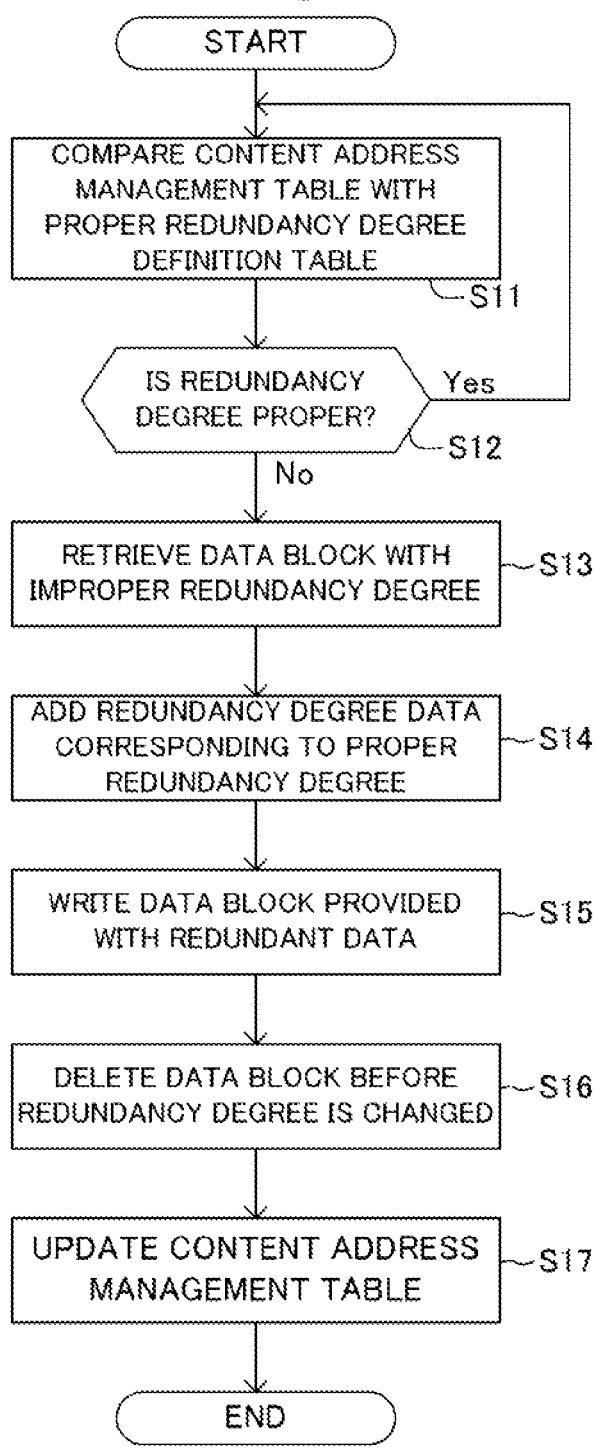
FIG. 6 is a flowchart showing an operation of the storage device disclosed in FIG. 1.

A first exemplary embodiment of the present invention will be described with reference to FIGS. 1 to 6. FIG. 1 is a function block diagram showing a configuration of a storage device. FIGS. 2A and 2B are views each showing an example of data stored in the storage device. FIGS. 3 to 4 are views each showing an aspect when data is stored in the storage device, and FIGS. 5 to 6 are flowcharts each showing an operation of the storage device.

[Configuration]

As shown in FIG. 1, a storage device 1 of this exemplary embodiment is a general computer equipped with an arithmetic device such as a CPU (Central Processing Unit) that executes an arithmetic process, and a storage device such as a hard disk drive that stores data. The arithmetic device is equipped with a data storing processing unit 11, a content address management unit 12, and a redundancy degree control unit 13, which are configured by installing a program. For example, the program is provided to the storage device 1 in a state stored in a storage medium such as a CD-ROM. Alternatively, the program may be stored in a storage device of another server computer on the network and provided to the storage device 1 from the other server computer via the network.

Further, the storage device included by the storage device 1 is equipped with a data storing unit 21, a content address management table 22, and a proper redundancy degree definition table 23. In FIG. 1, the storage device 1 is illustrated as one computer, but may be configured by a plurality of computers. Moreover, the storage device, specifically, the data storing unit 21 is configured by a plurality of storage devices such as a plurality of hard disk drives. Below, the respective configurations will be described in detail.

As a basic function, the data storing processing unit 11 (a data storing control unit) operates so as to write a file into the data storing unit 21 and retrieve a file from the data storing unit 21 in response to a request for storing a file and a request for retrieving a file inputted therein.

To be specific, an aspect when the data storing processing unit 11 writes a file will be described with reference to FIG. 3. Firstly, the data storing processing unit 11 divides a file A of a storage target into block data D of a predetermined capacity (e.g., 64 KB). Then, based on the data content of the block data D, the data storing processing unit 11 calculates a unique hash value representing the data content. The hash value is calculated based on the data content of the block data D by using a preset hash function.

Then, based on the hash value calculated from the block data D, the data storing processing unit 11 checks whether other block data D with the same data content is already stored in the data storing unit 21. It is assumed that block data with the same data content is not stored yet. In this case, the data storing processing unit 11 makes the block data redundant, and distributedly stores the data into the plurality of storage devices. To be specific, firstly, the data storing processing unit 11 compresses the block data D and divides into a plurality of fragment data of a predetermined capacity. For example, as shown by reference symbols D1 to D9, the data storing processing unit 11 divides into nine fragment data (division data 41). Then, the data storing processing unit 11 generates redundant data so as to be capable of restoring the original block data even when some of the fragment data obtained by division are lost, and adds to the fragment data 41 obtained by the division. For example, as shown by reference numerals D10 to D12, three fragment data (redundant data 42) are added. Thus, the data storing processing unit 11 generates a data set 40 composed of twelve fragment data configured by the nine division data 41 and the three redundant data 42.

Then, the data storing processing unit 11 distributedly stores the fragment data of the block data provided with redundant data as described above, into the plurality of storage devices configuring the data storing unit 21, respectively. Thus, even if three of the fragment data forming the block data are lost, it is possible to restore the original block data.

Next, a case in which, based on a hash value calculated from block data to be newly written, the data storing processing unit 11 determines that other block data with the same data content is already stored in the data storing unit 21 will be considered. In this case, the data storing processing unit 11 does not write the new block data, and refers to the already stored block data as the block data to be newly written. To be specific, the data storing processing unit 11 uses a content address referring to a storing destination address of the already stored block data as data referring to a storing position of the block data to be newly written. Consequently, it is possible to eliminate duplicated recording of the same data.

Next, the content address management unit 12 will be described. The content address management unit 12 manages a storing position of block data stored into the data storing unit 21 by the data storing processing unit 11, by using a content address specified according to the content of the block data. To be specific, when block data is newly stored as described above, the content address management unit 12 adds a new entry to the content address management table 22 and, as shown in FIG. 2A, stores so that a content address (address data) corresponding to the block data is related to a storing destination address actually storing the block data. Because a content address is, for example, data that includes a hash value calculated based on the data content of stored block data, the content address is also generated so as to be unique based on the data content of the block data. Consequently, by referring to a storing destination address related to a content address, it is possible to retrieve block data. The process of storing the content address and the storing destination address in relation to each other may be executed by the data storing processing unit 11.

Further, the content address management unit 12 stores and manages not only a content address and a storing destination address but also a reference counter and a redundancy degree in the abovementioned content address management table 22. In this case, a reference counter represents the number of times that a content address refers to, namely, the number of times that block data stored in a storing destination address referred to by the content address is referred to as other data. Therefore, when block data is newly stored, a reference counter thereof is '1.' Moreover, a redundancy degree is a value showing the redundancy degree of stored block data, and the degree of redundancy is higher as the number is larger. The redundancy degree in this exemplary embodiment represents the number of redundant data added to block data as described above. When block data is newly stored, a reference counter thereof is '1' and a redundancy degree corresponding thereto is set to '3' as described later.

A redundancy degree proper to the value of a reference counter (a reference count) is previously set and stored in the proper redundancy degree definition table 23 (a redundancy degree definition table). An example of the proper redundancy degree definition table 23 is shown in FIG. 2B. As shown in this drawing, a redundancy degree is set to '3' in a case that a reference count (the value of a reference counter) is in the range of 1 to 10, a redundancy degree is set to '6' in a case that a reference count is in the range of 11 to 100, and a redundancy degree is set to '9' in a case that a reference count is in the range of 101 to 1000. Thus, in the proper redundancy degree definition table 23, a redundancy degree is set to a higher value as a reference count is larger. A redundancy degree is set so as to correspond to each predetermined range of reference count (e.g., '1 to 10,' '11 to 100,' '101 to 1000'). The relation between reference counts and redundancy degrees disclosed in the proper redundancy degree definition table 23 is one example, and other set values may be used.

Further, in a case that a data block with the same content as block data to be newly written is already stored and the already stored block data is referred to by the data storing processing unit 11 as described above, the content address management unit 12 adds '1' to a reference count of the already stored block data. That is to say, the content address management unit 12 increments a reference count related to a content address referring to the already stored block data in the content address management table 22. Thus, for each stored block data, the content address management table 12 counts and stores the number of times that the block data is referred to.

Next, the redundancy degree control unit 13 will be described in detail. Firstly, the redundancy degree control unit 13 reads out the content address management table 22 managed by the content address management unit 12 and the proper redundancy degree definition table 23. Then, the redundancy degree control unit 13 compares reference counters (reference counts) and redundancy degrees related thereto within the content address management table 22, with reference counts and proper redundancy degrees within the proper redundancy degree definition table 23, thereby determining whether there is a difference therebetween. For example, in the content address management table 23 shown in FIG. 2A, the reference counter of a content address CA6 is '11' and the redundancy degree is '3.' On the other hand, in the proper redundancy degree definition table 23 shown in FIG. 2B, for the reference counts '11 to 100' including the value of the reference counter '11,' the proper redundancy degree is set to '6.' In this case, it is determined that there is a difference in redundancy therebetween and hence the redundancy degree is improper.

Then, upon determination that the redundancy degree is improper, the redundancy degree control unit 13 stores a data block specified by the content address CA6 into the data storing unit 21 so as to have redundancy corresponding to the proper redundancy degree. In this exemplary embodiment, a redundancy degree corresponds to the number of redundant data, and therefore, the redundancy degree control unit 13 changes the number of redundant data from '3' to '6' and stores the block data specified by the content address CA6. To be specific, in a process of changing a redundancy degree and storing, firstly, the redundancy degree control unit 13 acquires a storing destination address from the content address CA6 having a different redundancy degree and retrieves the block data at this storing destination. Then, the redundancy degree control unit 13 divides the retrieved block data and adds redundant data to the block data so that the redundancy degree becomes '6,' namely, six redundant data are added. For example, as shown in FIG. 4, the redundancy degree control unit 13 divides the data block D into six division data denoted by reference symbols D101 to D106 and adds six redundant data denoted by reference symbols D107 to D112, thereby generating a data set 40' composed of twelve fragment data, which does not change the total number of data. Then, the redundancy degree control unit 13 distributedly writes the respective fragment data into the plurality of storage devices.

Thus, the redundancy degree control unit executes redundancy processing so that a redundancy degree corresponds to the reference count of block data, that is, redundancy degrees become higher as reference counts are more, and stores the block data into the data storing unit 21. As one example of the redundancy processing corresponding to redundancy degrees, the redundancy degree control unit 13 in this exemplary embodiment executes a process of adding, to block data, a corresponding number of redundant data to a redundancy degree thereof, but the redundancy processing corresponding to redundancy degrees is not limited to the abovementioned process. For example, redundancy may be secured by storing duplicates of block data into a corresponding number of storage devices to the value of a redundancy degree.

Further, upon writing the block data with the redundancy degree changed into the data storing unit 21 as described above, the redundancy degree control unit 13 deletes the block data before change of the redundancy degree having been stored in the data storing unit 21.

Furthermore, the redundancy degree control unit 13 has a function of updating data within the content address management table 22. To be specific, so as to be related to the content address of the block data stored with the redundancy degree changed, the redundancy degree control unit 13 stores a storing destination address after change of the redundancy degree of the block data. That is, because the data content of the block data is not changed, the redundancy degree control unit 13 does not change the content address referring to the block data, and changes and updates the storing destination address related with the content address to the storing destination address stored after change of the redundancy degree. Moreover, the redundancy degree control unit 13 stores and updates the redundancy degree after change in relation to the content address.

The abovementioned process by the redundancy degree control unit 13 may be executed when the content address management unit 12 detects a change of a reference counter within the content address management table 22. That is to say, when the content address management unit 12 detects a change of a reference counter within the content address management table 22, the redundancy degree control unit 13 retrieves a redundancy degree within a record to which the reference counter is related, and compares the redundancy degree with the proper redundancy degree definition table as described above. Then, in a case that the redundancy degree is improper, the redundancy degree control unit 13 retrieves block data as described above, and changes and stores the redundancy degree again. The timing of the processing by the redundancy degree control unit 13 is not limited to the abovementioned timing necessarily, and the processing may be executed at predetermined time intervals.

[Operation]

Next, an operation of the abovementioned storage device 1 will be described with reference to flowcharts of FIGS. 5 to 6.

Firstly, upon reception of a request for writing a file (step S1), the storage device 1 divides the file into a plurality of block data, and regards these block data as storage targets. Then, the storage device 1 calculates a hash value of each of the block data (step S2), and determines whether the same data as the hash value is already stored. For example, the storage device 1 checks content addresses including hash values stored in the content address management table 22, and checks whether the same data is stored in portions corresponding to the hash values that are parts of the content addresses. The process of checking whether the same data is already stored may be executed in a manner that, for example, the storage device stores and holds a hash value of already stored block data by another method and compares the stored and held hash value with a hash value calculated from block data to be newly stored.

Then, in the case of determining that the same data as the block data to be newly stored is not stored (No at step S3), as shown in FIG. 3, the storage device 1 compresses and divides the block data D to be newly stored (reference numeral 41) and generates a data set 40 composed of a plurality of fragment data including redundant data (reference numeral 42) added to the data 41 (step S4). Because the reference counter (the reference count) is '1' in the case of block data to be newly stored, the storage device 1 sets the redundancy degree to '3' based on the proper redundancy degree definition table 23 and adds three redundant data.

Then, the storage device 1 distributedly stores the plurality of fragment data configuring the block data to be newly stored into a plurality of storage devices (step S5). After that, the storage device 1 adds a new entry to the content address management table 22 and, as shown in FIG. 2A, stores the content address, reference counter, redundancy degree and storing destination address of the newly stored block data (step S6). At this point, the reference counter is '1' and the redundancy degree is '3.'

Next, an operation when it is determined that the same data as block data to be newly stored is stored (Yes at step 3) will be described. In this case, the storage device 1 does not store the block data to be newly stored into the data storing unit 21, and executes a process of referring to already stored block data (step S7). Then, the storage device 1 increments the number of times that this already stored block data is referred to, namely, the reference counter of the data block stored in the content address management table 22, and updates (step S8).

Subsequently, the storage device 1 executes a redundancy degree control process at the timing of update of data within the content address management table, or at predetermined time intervals. Below, a case of executing the redundancy control process at predetermined time intervals will be described.

Firstly, the storage device 1 acquires a reference counter and redundancy degree of each block data from the content address management table 22, and compares with the value of a proper redundancy degree of each of the reference counts defined in the proper definition table 23 (step S11). At this moment, for example, it is assumed that the content of the content address management table 22 is data shown in FIG. 2A and the content of the proper redundancy degree definition table 23 is data shown in FIG. 2B. The reference counter of the data block of the content address CA6 is '11' and the redundancy degree is '3,' but a proper redundancy degree is '6' according to the proper redundancy degree definition table 23. Therefore, it can be determined that there is a difference in redundancy and the redundancy degree is improper (No at step S12).

In this case, the storage device 1 acquires a storing destination address related with the content address CA6 from the content address management table 22, and retrieves the block data referred to by the content address CA6 (step S13). Subsequently, the storage device 1 adds redundant data to the retrieved block data referred to by the content address CA6 so that the redundancy degree becomes a proper value '6' (step S14). At this moment, for example, as shown in FIG. 4, the storage device 1 divides the block data into six division data and adds six redundant data thereto. Then, the storage device 1 distributedly writes the block data to which the redundant data are added, into the data storing unit 21 configured by a plurality of storage devices (step S15). Thus, the storage device 1 stores the block data so as to have redundancy corresponding to a proper redundancy degree to the number of times that the block data is referred to.

After that, the storage device 1 deletes the block data before change of the redundancy degree having been stored in the data storing unit 21, from the data storing unit 21 (step S16). Moreover, the storage device 1 updates data within the content address management table 22, specifically, the redundancy degree of the data block of the content address CA6 and a new storing destination address of the block data after change of the redundancy degree (step S17).

As described above, according to the storage device of the present invention, in a case that the number of times that block data having been already stored is referred to increases and the redundancy degree of the block data becomes improper, the redundancy degree of the block data is changed to a proper value and stored. Therefore, it is possible to store data so as to have a proper degree of redundancy in accordance with the importance of the stored data, and it is possible to efficiently use a storage capacity and a resource spent on a storing process. As a result, it is possible to provide a storage device that can realize increase of reliability and system performance.

Further, even when the redundancy degree of the stored data is changed and stored again, a storing destination address that specifies a new storing position of this block data is stored so as to be referred to by the content address having been referred to the block data before change of the redundancy degree. Accordingly, because the content address for accessing the block data is not changed, it is possible to still access the same block data from outside by using the same content address, whereby data management is facilitated and it is possible to increase the performance of the storage device.

Second Exemplary Embodiment

A second exemplary embodiment of the present invention will be described with reference to FIG. 7. FIG. 7 is a function block diagram showing a configuration of a storage device. In this exemplary embodiment, the storage device will be schematically described.

As shown in FIG. 7, a storage device 100 of this exemplary embodiment includes:

a data storing control unit 111 configured to store storage target data into a storage device 121 and, in a case of storing other storage target data with a same content as the storage target data already stored in the storage device, into the storage device, control so as to refer to the storage target data already stored in the storage device as the other storage target data;

a reference count management unit 112 configured to, for each of the storage target data stored in the storage device, store a reference count that is a number of times that the storage target data is referred to as other storage target data; and a redundancy degree control unit 113 configured to execute redundancy processing corresponding to a redundancy degree proper to the reference count of the storage target data, and store the storage target data into the storage device.

Then, in the storage device, the redundancy degree control unit is configured to execute the redundancy processing corresponding to the redundancy degree that is higher as the reference count of the storage target data is larger, and store the storage target data into the storage device.

Further, in the storage device, the redundancy degree control unit is configured to add, to the storage target data, a corresponding number of redundant data to the redundancy degree proper to the reference count of the storage target data, and distributedly store into a plurality of storage devices.

According to the present invention, in the storage device, storage target data is firstly stored into the storage device. At this moment, in a case that storage target data with the same content has already been stored in the storage device, the new storage target data is not stored, and the already stored storage target data is referred to and used. Moreover, in the storage device, the number of times that the storage target data stored in the storage device is referred to is stored. Then, the storage device executes the redundancy processing corresponding to a redundancy degree that is set according to a reference count of storage target data, and stores the storage target data into the storage device. At this moment, specifically, a redundancy degree is set to a higher degree as a reference count is larger. Then, for example, the storage device adds a corresponding number of redundant data to the redundancy degree, to the storage target data, and distributedly stores into a plurality of storage devices.

Thus, in the present invention, in accordance with a reference count that is equivalent to the degree of importance of storage target data, a redundancy degree of the storage target data is set and stored into the storage device. Therefore, it is possible to store storage target data so as to have a proper degree of redundancy according to the redundancy degree of the storage target data, and it is also possible to efficiently use a storage capacity and a resource spent on a storing process. As a result, it is possible to provide a storage device that can realize increase of the reliability and the system performance.

Further, in the storage device, the redundancy degree control unit is configured to, in a case that the redundancy processing is executed so as to change the redundancy degree of the storage target data already stored in the storing device and the storage target data is stored into the storage device, delete the storage target data before change of the redundancy degree from the storage device.

Thus, after storage target data set to a redundancy degree proper to a reference count is stored, storage target data with the same content before change of the redundancy degree is deleted, so that it is possible to use a storage capacity with efficiency.

Further, in the storage device:

the data storing control unit is configured to store a storing destination address specifying a storing position of the storage target data stored in the storage device so as to be related to address data referring to the storing destination address; and the redundancy degree control unit is configured to store the new storing destination address specifying the storing position of the storage target data stored after change of the redundancy degree so as to be related to the address data of the storage target data.

Further, in the storage device, the redundancy degree control unit is configured to, when the reference count management unit detects a change of the reference count of the storage target data, operate so as to execute a process of changing the redundancy degree of the storage target data.

Thus, even when a redundancy degree of storage target data is changed and stored again, a storing destination address that specifies a new storing position of this storage target data is stored so as to be referred to by address data before change. Because address data for accessing the storage target data is not changed, data management is facilitated, and it is possible to realize increase of the performance. Moreover, because a process of changing a redundancy degree is executed only when a reference count is changed, it is possible to limit processing load of the storage device.

Further, in the storage device:

a redundancy degree definition table in which a redundancy degree corresponding to each predetermined range of reference counts is stored; and the redundancy degree control unit is configured to, so that the redundancy degree of the storage target data becomes a redundancy degree set in the redundancy degree definition table corresponding to the reference count of the storage target data, execute the redundancy processing corresponding to the redundancy degree, and store the storage target data into the storage device.

Thus, because a redundancy degree is set so as not to be changed within a predetermined range of reference counts, it is possible to prevent frequent change of the redundancy degree. Therefore, it is possible to limit processing load of the storage system, and it is possible to realize increase of the performance of the storage device.

Further, the abovementioned storage device can be realized by installing a computer program into an information processing device. To be specific, a computer program of another embodiment of the present invention is a computer program comprising instructions for causing an information processing device to realize:

a data storing control unit configured to store storage target data into a storage device and, in a case of storing other storage target data with a same content as the storage target data already stored in the storage device, into the storage device, control so as to refer to the storage target data already stored in the storage device as the other storage target data;

a reference count management unit configured to, for each of the storage target data stored in the storage device, store a reference count that is a number of times that the storage target data is referred to as other storage target data; and a redundancy degree control unit configured to execute redundancy processing corresponding to a redundancy degree proper to the reference count of the storage target data, and store the storage target data into the storage device.

Then, in the computer program, the redundancy degree control unit is configured to execute the redundancy processing corresponding to the redundancy degree that is higher as the reference count of the storage target data is larger, and store the storage target data into the storage device.

Further, a data storing method of another embodiment of the present invention that is executed by operating the abovementioned storage device includes:

executing a data storing process of storing storage target data into a storage device and, in a case of storing other storage target data with a same content as the storage target data already stored in the storage device, into the storage device, controlling so as to refer to the storage target data already stored in the storage device as the other storage target data;

for each of the storage target data stored in the storage device, storing a reference count that is a number of times that the storage target data is referred to as other storage target data; and executing redundancy processing corresponding to a redundancy degree proper to the reference count of the storage target data, and storing the storage target data into the storage device.

Then, the data storing method includes, when executing the redundancy processing and storing the storage target data, executing the redundancy processing corresponding to the redundancy degree that is higher as the reference count of the storage target data is larger, and storing the storage target data into the storage device.

Inventions of a computer program or a data storing method having the abovementioned configurations have like actions as the abovementioned storage device, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-071081, filed on Mar. 24, 2009, the disclosure of which is incorporated herein in its entirety by reference.

INDUSTRIAL APPLICABILITY

The present invention can be utilized for a content address type of storage device that manages a storing position according to the content of stored data, and has industrial applicability.

DESCRIPTION OF REFERENCE NUMERALS 1 storage device
11 data storing processing unit
12 content address management unit
13 redundancy degree control unit
21 data storing unit
22 content address management table
23 proper redundancy degree definition table
100 storage device
111 data storing control unit
112 reference number management unit
113 redundancy degree control unit
121 storage device

The invention claimed is:

1. A storage device comprising:
a data storing control unit configured to store storage target data into a storage device and, in a case of storing other storage target data with a same data content as the storage target data already stored in the storage device into the storage device, control so as to refer to the storage target data already stored in the storage device as the other storage target data;
a reference count management unit configured to, for each of the storage target data stored in the storage device, store a reference count that is a number of times that the storage target data is referred to as other storage target data; and
a redundancy degree control unit configured to execute redundancy processing corresponding to a redundancy degree proper to the reference count of the storage target data, and store the storage target data into the storage device.

2. The storage device according to claim 1, wherein:
the redundancy degree control unit is configured to execute the redundancy processing corresponding to the redundancy degree that is higher as the reference count of the storage target data is larger, and store the storage target data into the storage device.

3. The storage device according to claim 1, wherein:
the redundancy degree control unit is configured to add, to the storage target data, a corresponding number of redundant data to the redundancy degree proper to the reference count of the storage target data, and distributedly store into a plurality of storage devices.

4. The storage device according to claim 1, wherein:
the redundancy degree control unit is configured to, in a case that the redundancy processing is executed so as to change the redundancy degree of the storage target data already stored in the storing device and the storage target data is stored into the storage device, delete the storage target data before change of the redundancy degree from the storage device.

5. The storage device according to claim 1, wherein:
the data storing control unit is configured to store a storing destination address specifying a storing position of the storage target data stored in the storage device so as to be related to address data referring to the storing destination address; and
the redundancy degree control unit is configured to store the new storing destination address specifying the storing position of the storage target data stored after change of the redundancy degree so as to be related to the address data of the storage target data.

6. The storage device according to claim 1, wherein:
the redundancy degree control unit is configured to, when the reference count management unit detects a change of the reference count of the storage target data, operate so as to execute a process of changing the redundancy degree of the storage target data.

7. The storage device according to claim 1, wherein:
a redundancy degree definition table in which a redundancy degree corresponding to each predetermined range of reference counts is stored; and
the redundancy degree control unit is configured to, so that the redundancy degree of the storage target data becomes a redundancy degree set in the redundancy degree definition table corresponding to the reference count of the storage target data, execute the redundancy processing corresponding to the redundancy degree, and store the storage target data into the storage device.

8. A computer-readable storage medium that stores a program comprising instructions for causing an information processing device to realize:

a data storing control unit configured to store storage target data into a storage device and, in a case of storing other storage target data with a same content as the storage target data already stored in the storage device into the storage device, control so as to refer to the storage target data already stored in the storage device as the other storage target data;

a reference count management unit configured to, for each of the storage target data stored in the storage device, store a reference count that is a number of times that the storage target data is referred to as other storage target data; and a redundancy degree control unit configured to execute redundancy processing corresponding to a redundancy degree proper to the reference count of the storage target data, and store the storage target data into the storage device.

9. The computer-readable storage medium that stores the program according to claim 8, wherein:

the redundancy degree control unit is configured to execute the redundancy processing corresponding to the redundancy degree that is higher as the reference count of the storage target data is larger, and store the storage target data into the storage device.

10. A data storing method comprising:

executing a data storing process of storing storage target data into a storage device and, in a case of storing other storage target data with a same content as the storage target data already stored in the storage device into the storage device, controlling so as to refer to the storage target data already stored in the storage device as the other storage target data;

for each of the storage target data stored in the storage device, storing a reference count that is a number of times that the storage target data is referred to as other storage target data; and executing redundancy processing corresponding to a redundancy degree proper to the reference count of the storage target data, and storing the storage target data into the storage device.

11. The data storing method according to claim 10, comprising:

when executing the redundancy processing and storing the storage target data, executing the redundancy processing corresponding to the redundancy degree that is higher as the reference count of the storage target data is larger, and storing the storage target data into the storage device.

* * * * *